(12) United States Patent
Stone et al.

(10) Patent No.: US 9,550,872 B2
(45) Date of Patent: Jan. 24, 2017

(54) PROCESS FOR RECOVERING NYLON AND POLYPROPYLENE FROM A NYLON FIBER SOURCE

(71) Applicant: TEKNOR APEX COMPANY, Pawtucket, RI (US)

(72) Inventors: Andrew D. Stone, Bristol, RI (US); Craig A. White, Cumberland, RI (US); Joseph A. Marcella, Sharon, MA (US)

(73) Assignee: TEKNOR APEX COMPANY, Pawtucket, RI (US)

( * ) Notice: Subject to any disclaimer, the term of this patent is extended or adjusted under 35 U.S.C. 154(b) by 0 days.

(21) Appl. No.: 14/725,530

(22) Filed: May 29, 2015

(65) Prior Publication Data
US 2016/0347925 A1 Dec. 1, 2016

(51) Int. Cl.
*C08J 11/06* (2006.01)
*B29B 17/00* (2006.01)

(52) U.S. Cl.
CPC ............. *C08J 11/06* (2013.01); *C08J 2367/02* (2013.01); *C08J 2377/06* (2013.01)

(58) Field of Classification Search
CPC ....................................................... C08J 11/06
USPC ........................................................... 521/45
See application file for complete search history.

(56) References Cited

U.S. PATENT DOCUMENTS

| 5,722,603 A | 3/1998 | Costello et al. |
| 6,126,096 A | 10/2000 | Robinson et al. |
| 7,784,719 B1 * | 8/2010 | Wingard ................. B29B 17/02 241/20 |
| 2013/0174517 A1 | 7/2013 | Kelley et al. |
| 2014/0251545 A1 | 9/2014 | Burich et al. |

OTHER PUBLICATIONS

Search Reported dated Aug. 29, 2016.

* cited by examiner

*Primary Examiner* — Terressa Boykin
(74) *Attorney, Agent, or Firm* — Hudak, Shunk & Farine Co. LPA

(57) ABSTRACT

The present invention relates to a process for recovering individual polymers, such as nylon and polyolefin, from a nylon-containing source such as a carpet. The process includes the steps of shredding a nylon fiber source such as a carpet wherein the shredding is conducted in the presence of a liquid that wets the carpet, granulating the wet shredded carpet slurry, further diluting the granulated slurry by adding additional water, subsequently refining the fibers and removing substantial amounts of polypropylene fibers from the slurry, preferably using a lamella clarifier, and recovering the nylon fibers by hydrocloning the slurry.

20 Claims, 1 Drawing Sheet

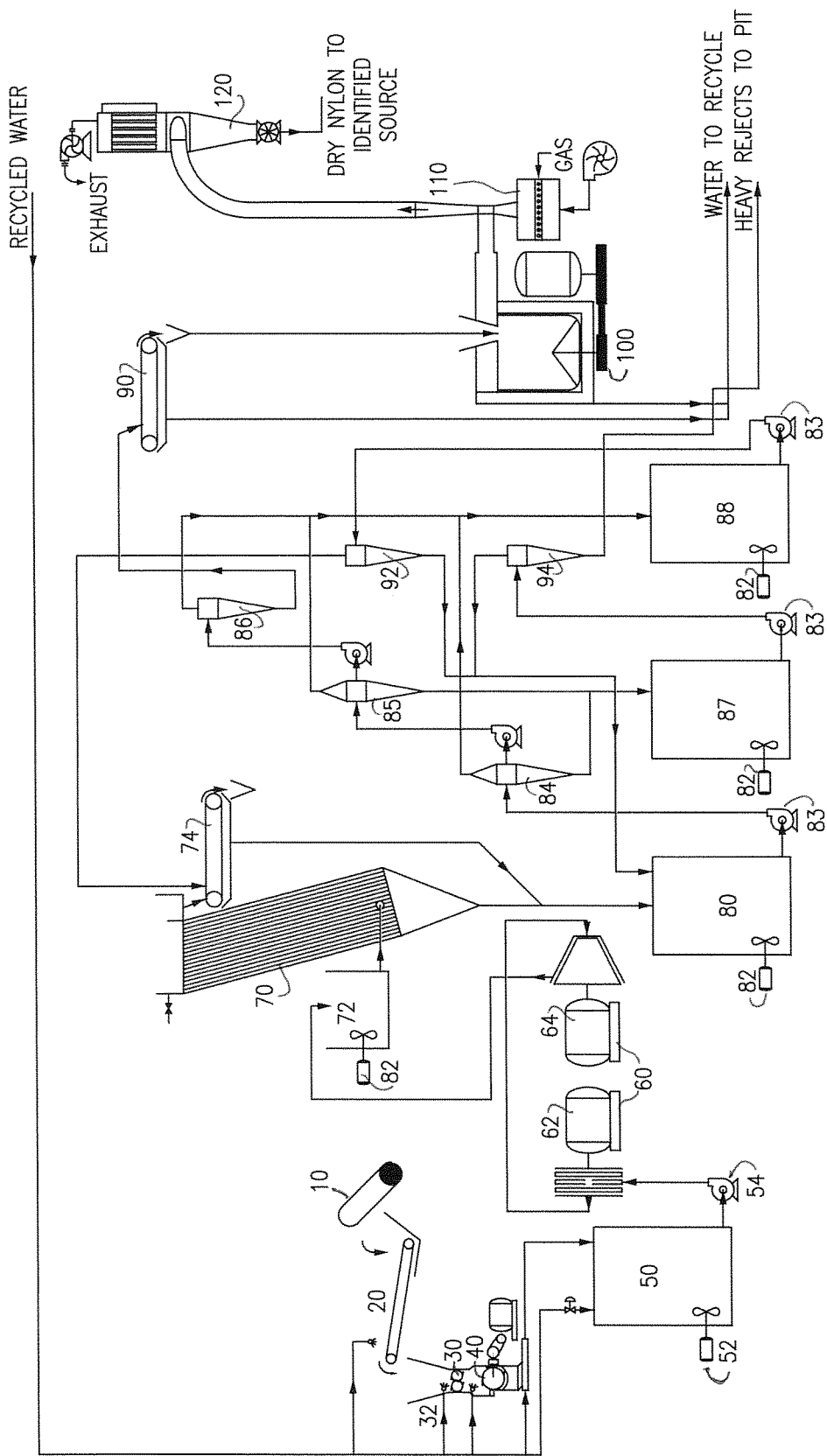

PROCESS FOR RECOVERING NYLON AND POLYPROPYLENE FROM A NYLON FIBER SOURCE

FIELD OF THE INVENTION

The present invention relates to a process for recovering individual polymers, such as nylon and polyolefin, from a nylon-containing source such as a carpet. The process includes the steps of shredding a nylon fiber source such as a carpet wherein the shredding is conducted in the presence of a liquid that wets the carpet, granulating the wet shredded carpet slurry, further diluting the granulated slurry by adding additional liquid, subsequently refining the fibers and removing substantial amounts of polypropylene fibers from the slurry, preferably using a clarifier, and recovering the nylon fibers by hydrocloning the slurry.

BACKGROUND OF THE INVENTION

Much work has been devoted to the recovery of various nylon fibers such as nylon 6 and nylon 6,6 from carpets because of the value of such polymers. The nylon-containing carpets, generally contain three components, for example from about 40 to about 60 weight percent and generally approximately about 50 weight percent of nylon 6 fiber or alternatively, nylon 6,6 fiber, and generally from about 20 to about 30 and approximately about 25 percent by weight of the carpeting is a polyolefin, such as polypropylene backing generally in the form of a horizontal weave intertwined with the upright or vertical nylon fibers as well as any polyolefin fibers. The remaining amount of from about 20 to about 30 and approximately 25 percent by weight of the carpet composition is an adhesive, such as, but not limited to, a latex adhesive backing or glue that is generally a mixture of rubber such as styrene-butadiene rubber and an inexpensive non-water soluble filler such as calcium carbonate ($CaCO_3$) powder. $CaCO_3$ filled PVC is also used. As known to the art, heat rollers applied to the backing of the carpet generally set or cure the rubber and thus forms a rubber backing.

Polypropylene is incompatible or immiscible with nylon. It also has inferior physical properties to nylon such as much lower melt temperature and substantially lower strength. Congealed droplets of polypropylene serve as crack initiation points, lowering the overall strength of nylon product. The droplets on the surface of a molded part can give poor appearance. The "polymer blooming" of polypropylene can detract from paint and decal adherence. To combat this, expensive ingredients known as compatiblizers can be added with a certain degree of mitigation.

U.S. Pat. No. 7,784,719 granted Aug. 31, 2010, to Wellman Plastics Recycling, LLC relates to methods of recovering primary construction materials from whole carpet. A negative result is that the utilization of a dry size reduction process inherently involves high frictional contact that softens the polypropylene such that it attaches to itself and to nylon fibers resulting in a fiber combination that neither sinks nor floats. The resulting reclaimed nylon can contain detectable amounts of polypropylene therein.

U.S. Publication 2013/0174517 published Jul. 11, 2013, to Environmental Recycled Carpet Systems, LLC relates to a carpet recycling method wherein a toroidal flow pulper shears a carpet in the presence of a liquid to form a slurry of fibrous carpet materials and latex/calcium carbonate solids. After drying, a first output comprising dried separated fibrous carpet materials is produced, and a second output comprising dried latex/calcium carbonate solids is produced. A negative aspect of this application is that it does not adequately reduce the fiber length for efficient separation. Additionally, this process can obtain polypropylene fibers that melt due to the high shear utilized in dry granulation resulting in a high level of contamination between the carpet fiber and backing.

U.S. Publication 2014/0251545 published Sep. 11, 2014, to Burich and Murdock relates to a process and method for recycling carpet wherein desired carpet face fibers are reportedly liberated and separated from the carpet backing. The process reportedly eliminates face fiber shearing. The secondary layer of the carpet backing is then removed either manually or mechanically. Then, the bottom of the primary backing layer of the carpet with the bottom of the face fiber "U's" exposed, is mechanically grip-abraded by a rubber material. The grip-abrasion of the rubber or rubber-like material across the bottom of the primary carpet backing layer loosens the glue and grips and pulls the face fiber from the primary backing reportedly without destructing primary or secondary backing and allows the backing material to be recycled. A dry process is thus utilized with its inherent negative aspect of softening polypropylene. Fiber shortening is not effectively achieved.

SUMMARY OF THE INVENTION

In view of the above, an aspect of the present invention is to provide an effective separation process for recovering individual polymers, utilized to form a carpet, such that the same can be recycled and utilized in other components or goods. Still another aspect of the present invention is to address the issue of the production of frictional heat by shredding, granulation, or the like that essentially leads to the welding or attachment of a polyolefin such as polypropylene to nylon that is difficult, if not impossible, to reverse. An additional aspect of the present invention is to achieve a suitable fiber length in order to efficiently separate and recover nylon from a polyolefin.

The above aspects and others are accomplished by the methods of the present application, which are particularly appropriate for recovering nylon or polyester face fibers from post-industrial, post-consumer carpet waste.

The present invention utilizes wet shredding and wet granulation to eliminate the problems of developing high frictional heat and long fiber lengths, as well as nylon generally contaminated with polypropylene and/or carpet backing. The granulated slurry is diluted and refiners are used to further reduce the length of the nylon and polypropylene fibers. A substantial amount of the polypropylene is then separated from the slurry utilizing clarifier techniques. Centrifuging is avoided because of equipment cost and energy consumption. Rather, a hydroclone system is utilized for separating the nylon fibers from the slurry. The present invention achieves high amounts of nylon fiber recovery, low polypropylene contamination thereof, and low latex/calcium carbonate ash content in the recycled nylon fibers.

A process for recovering nylon from a nylon fiber source comprises the steps of applying a liquid to said nylon fiber source to wet the nylon fiber source, the nylon fiber source comprising nylon fibers, polyolefin fibers, and a latex adhesive backing material; shredding said wetted nylon fiber source to form a wet shredded slurry; granulating said wet shredded slurry and reducing the length of the nylon fibers and polyolefin fibers to form a wet granulated slurry; and separating said nylon fibers from said polyolefin fibers.

BRIEF DESCRIPTION OF THE DRAWINGS

FIG. 1 relates to a schematic view of the one embodiment of a recovery system of the present invention.

DETAILED DESCRIPTION OF THE INVENTION

In this specification, all numbers disclosed herein designate a set value, individually, in one embodiment, regardless of whether the word "about" or "approximate" or the like is used in connection therewith. In addition, when the term such as "about" or "approximate" is used in conjunction with a value, the numerical range may also vary, for example by 1%, 2%, 5%, or more in various other independent embodiments.

A nylon fiber source is obtained from a supply such as furniture coverings, drapes, blinds, and the like, and preferably from nylon-containing whole carpets including, in one embodiment, broadloom and tufted. While various nylon fiber sources can be utilized, the present invention will be discussed with respect to carpet, with the understanding that other nylon fiber sources such as those noted herein above, can also be utilized in the systems and processes of the present invention.

The nylon-containing carpets of the present invention are tested with respect to the type of nylon that they substantially contain, for example, nylon 6, or nylon 6,6, and are separated into separate piles. The different types of nylon or other polymers such as PET are not simultaneously subjected to recycling using recycling system 10 of the present invention since a combined product is not desirable.

As set forth above, the nylon-containing carpets generally contain three components, nylon, polyolefin, and an adhesive backing in the noted amounts. The polyolefin, such as polypropylene, is generally in the form of a horizontal weave intertwined with the upright, broadloom, or vertical nylon fibers as well as any polyolefin fibers. The latex adhesive backing is generally a mixture of rubber such as styrene-butadiene rubber and calcium carbonate ($CaCO_3$) powder. As known to the art, heat rollers applied to the backing of the carpet generally set or cure the rubber and thus bind the carpet materials together.

As known to the art, nylon has a specific gravity greater than 1 such as about 1.14, while the various olefins, such as polypropylene, are lighter and have a specific gravity less than 1, such as from about 0.85 to about 0.95. Thus, nylon will sink in water whereas the various polyolefins will float. The specific gravity of the adhesive backing is generally from about 1.7 to about 2.0.

Recycling system 10 of the present invention is set forth in detail in FIG. 1 wherein a whole nylon carpet is initially fed to belt feeder 20. Being an aqueous process, the carpet is sprayed with a liquid, preferably water, on belt feeder 20 as it traverses the same and is transferred to shredder 30 that has one or more sprayers 32 to maintain nylon carpet in a wet condition. With respect to the present invention, the term "wet" means that the entire nylon source, including the various fibers of the carpet as well as the backing and other components of the carpet, is wetted with a liquid, preferably water. In numerical terms, at least about 90 percent, desirably at least about 95 percent, preferably at least about 98 percent, and most preferably 100 percent of the nylon source or carpet surface area including the face fibers is covered or contacted with the liquid. Other criteria for the amount of water utilized include sufficient amounts to cool hot zones (cutting areas) of the shredding operation as well as enough to assist in conveying all slurried, granulated material out of a granulator to a tank. In general, it is difficult to utilize too much water in the shredding as well as the granulating operations of the present invention. Stated in another manner, a suitable amount of liquid is utilized to prevent attaching or sticking of a polyolefin to nylon, in particular nylon fibers.

Generally any type of shredder 30, and number thereof, known to the literature and to the art can be utilized that shreds the wet nylon-containing carpet and results in chunks thereof, unravels the various fibers such as nylon, and polyolefin, and also separates the adhesive backing from the fibers. Such shredding also results in small particles of the above-noted components. Suitable shredders that can be utilized include single and double shaft designs. An example of a single shaft shredder includes a Republic Machine RM Carpet Shredder. An example of a double shaft design is a Jordan Reduction Systems MS-4220 Dual Shaft Shredder.

After the shredding operation, the wet shredded carpet slurry is transferred to one or more granulators 40 that contain one or more water sprayers 32 to insure that the shredded carpet is maintained in a wet condition. The function of the granulators is to further separate the nylon-containing feedstock such as carpet into individual fibers or particles of nylon, polyolefin, and adhesive backing material. Another important aspect is that they further reduce the length of the various nylon and polyolefin fibers. Suitable wet granulators are well known to the art and literature and include single rotor/fixed bed knife designs. An example of a single rotor/fixed bed knife design is a Jordan Reduction 14CSG Closed Rotor Grinder. The wet granulation step generally results in fibers that are approximately 1.27 cm (0.5 inch)" in length. After granulation the entire composition is a wet slurry and can be characterized as being in the form of wet sand or loose Play-Doh®. The granulator should use a discharge screen with openings between 7 and 14 mm, preferably 12 mm for optimal operation and particle size.

It is an important aspect of the present invention that a carpet that is dry, somewhat dry, and generally does not contain amounts of water that substantially cover the entire surface area of the various components of the carpet, is not utilized. This is because it has been found that the various shredding and shearing operations produce high amounts of frictional heat that soften the polyolefins to a point where it attaches itself or sticks to a nylon fiber thus resulting in a combined fiber that neither sinks nor floats in water. Another problem with respect to carpet fibers and backing that are not substantially wet is that the mobility or movement thereof is impaired such that separation thereof is limited. Thus, substantial amounts of polyolefin fiber are obtained with the nylon fibers. Accordingly, as previously noted, an important aspect of the present invention is that the various carpet fibers and materials are substantially wet. Another important aspect of the size reduction process is that the fiber and latex adhesive/$CaCO_3$ components become unattached from each other. Both by tuft opening into individual filaments and by working through the narrow tolerances of the size reducing equipment, the latex adhesive/$CaCO_3$ becomes unglued from both the nylon and the polypropylene.

After the wet shredding and granulation steps, the slurry comprising the granulated carpet materials is fed to tank 50 where the material is further diluted with large amounts of water such that the amount of granulated material is generally about 2 percent or less by weight, desirably about 1 percent or less by weight, and preferably about 0.8 percent or less by weight based on the total weight of the diluted slurry composition. Such low amounts are important to the consistency of the slurry so that later steps of the present invention can be optimally performed. Tank 50 also contains various agitators or mixers to control the consistency therein.

Since it is an important aspect of the present invention that the fibers are of a very short length, the diluted slurry in tank 50 is fed via pump 54 to one or more refiners 60. Various refiners can be utilized with a desired refiner being a double disc refiner 62. Such refiners are known to the literature and to the art, for example, a GL&V DD® 6000and a Valmet OptiFiner. Double disc refiner 62 serves to condition and reduce the non-fiber particles in size. The refiner can contain a refining zone between two flat discs. one rotating (rotor) and the other stationary (stator). A hydraulic system, operated by a valve guide, not shown, controls disc clearance in the refining zone. The segments are mounted on segment holders with the disc clearance being kept constant during various operation conditions by means of the hydraulic control system. The reduced-size fiber-containing diluted slurry material is then fed to a second or conical refiner 64. Desirably a conical refiner 64 is utilized that further reduces the fiber length since it has a large cutting edge to throughput ratio, and also has good cutting gap stability. A suitable conical refiner is made by Valmet which makes the Opti-Finer. It is a desired aspect of the present invention that the refiners reduce the length of the fibers, i.e. nylon and polyolefins, from about 1.27 cm (0.5 inch) to generally about 2 mm or less, desirably to about 1 mm or less, and preferably about 0.5 mm or less.

In order to recover large amounts of the small polyolefin, preferably polypropylene fiber, the slurry is pumped to clarifier 70 via clarifier feed tank 72. A lamella type clarifier is desired that is an inclined-plate clarifier designed to remove particles from liquids. Such clarifiers contain a series of incline plates that provide a large effective settling area for a small footprint. The inlet stream is stilled upon entry to the clarifier whereupon solid and heavier particles such as nylon and carpet backing begin to settle on the plates and accumulate in collection hoppers at the bottom of the clarifier. The polyolefin, preferably polypropylene is thus drawn off the top of the plates. The clarifier generally removes at least about 70%, desirably at least about 85%, and preferably at least about 90% by weight of the polyolefin contained in the nylon source such as a carpet. An example of a suitable clarifier is Westech SuperSettler™ Lamella Plate Clarifier. The polypropylene obtained at the top of the clarifier is then sent to belt filter 74 and dried.

The remaining slurry containing water, adhesive backing, as well as the nylon fibers and some polyolefin fibers obtained from the bottom of the lamella clarifier is adjusted for consistency and pumped to hydroclone feed chest 80 containing agitator 82 therein. The slurry solution via feed pump 83 is sent to a plurality of hydroclone separators such as 84, 85, and 86. Such a three stage hydroclone system as shown in FIG. 1. Hydroclones are known to the art and are designed to convert incoming liquid velocity into rotary motion. They do this by directing inflow tangentially near the top of a vertical cylinder. This spins the entire contents of the cylinder, creating centrifugal force in the liquid. Heavy components move outward toward the wall of the cylinder where they agglomerate and spiral down the wall to the outlet at the bottom of the vessel. Lighter components move towards the axis of hydroclone 86 where they move upward to the outlet at the top of the vessel. The hydroclones can be adjusted so that an intermediate weight component such as nylon, specific gravity about 1.1, can be discharged through a side port. Thus, light materials such as polypropylene exit at the top of the hydroclone whereas relatively heavy materials such as the adhesive backing, for example SBR/$CaCO_3$ exit the bottom of the hydroclone. The nylon can be discharged either at the top or side, as desired. Ultimately, heavy rejects are collected in heavy reject feed chest 87 with the light reject cleaning materials being collected in light reject feed chest 88.

As set forth in FIG. 1, the combination of the various multiple hydroclones in conjunction with the two cleaner hydroclones 92 and 94 serve to separate any remaining polyolefin fibers or particles from the heavier rubber backing particles as well as the heavier nylon particles. The operation of the hydroclone system is as follows. Slurry from hydroclone feed chest 80 via pump 83 is fed to a first hydroclone 84 wherein the heavy material, i.e. adhesive/$CaCO_3$ is withdrawn from the bottom and fed to heavy reject feed chest 87, and wherein the lightest component, i.e. polyolefin is withdrawn from the top and fed to light reject feed chest 88. From the middle portion of hydroclone 84, a feedstream high in nylon fiber is withdrawn and fed to hydroclone 85. As with hydroclone 84, the heavy material is withdrawn from the bottom of hydroclone 85 and fed to heavy reject feed chest 87, with the light material such as polyolefin being fed to light reject feed chest 88. Generally from the middle section of hydroclone 85, a feedstream high in nylon fibers fed to hydroclone 86. Due to the fact that the heavy reject material, adhesive/$CaCO_3$, is readily separated because of its high specific gravity, the slurry feedstream fed to hydroclone 86 is essentially free of said adhesive/$CACO_3$. Thus, hydroclone 86 withdraws a feedstream that contains essentially only nylon fibers from the bottom thereof and feds it to nylon belt filter 90. The light material of polyolefin is drawn from the top of hydroclone 86 and fed to light reject feed chest 88.

The recovery system of the present invention further purifies through the use of cleaner hydroclones 92 and 94. More specifically, material from heavy reject feed chest 87 which is high in adhesive/$CaCO_3$ is fed to cleaner hydroclone 94 that separates the light material therein, essentially nylon or PET and recycles the same to hydroclone feed chest 80, with the material exiting from the bottom of hydroclone 94 being essentially adhesive/$CACO_3$ being fed to a disposal area. Material from light reject cleaner chest 88 that contains mostly polyolefin particles or fibers, is pumped into reject cleaner hydroclone 92. The lightweight material therein, i.e. the polyolefin is drawn out of the top of hydroclone 92 and disposed of in proper suitable environmental friendly manner. The bottom material withdrawn is essentially nylon and the same is fed to recycle to hydroclone feed chest 80.

The nylon particles that are fed to nylon belt filter 90 is subsequently fed to centrifuge 100 where water is separated therefrom with additional water being withdrawn in nylon flash dryer 110. Subsequently, the nylon material therefrom is sent to cyclone/bag filter 120 where it is bagged for subsequently reuse.

The invention will be better understood by reference to the following examples which serve to illustrate, but not to limit, the present invention.

A typical material balance would be for 100 pounds of carpet entering, 50 pounds would be fiber such as nylon (PA) or PET, 25 pounds would be polypropylene (PP) and the remaining 25 pounds latex/$CaCO_3$ (S). The first separation in the lamella has 93% PP coming off, yielding 22.5 pounds PP with 1.7 pounds PA. The light exit stream from the hydroclones would be 2.7 pounds total containing 2.5 pounds of PP and 0.2 pounds PA. The heavy exit stream from the hydroclones at 80% S would be 31.0 pounds total containing 24.8 pounds S and 6.2 pounds PA. The product stream from the hydroclones would be 42.1 pounds total containing 41.9 pounds of PA and 0.2 pounds S.

The process for recovering nylon from a nylon source is very efficient and achieves very pure nylon material. That is, the nylon recovered as from cyclone/bag filter 120 generally contains about 1.0% or less by weight, desirably about 0.6% or less by weight, or preferably a non-detectable amount of polyolefin based upon the total weight of the recovered nylon. The amount of ash from adhesive/$CaCO_3$ recovered from the cyclones/bag filter generally is about 0.5% or less, desirably is about 0.45% or less, and preferably is about 0.40% or less by weight based upon the total weight of the recovered nylon. The dried nylon obtained from cyclone/bag filter 120 was tested with regard to the various physical properties and results thereof are set forth in Table 1. Various tests are utilized to determine contamination such as polyolefin and calcium carbonate.

The DSC ISO 11357 method is used to determine polypropylene detection. Typical isotactic polypropylene homopolymer used in carpet backing has a crystalline content of approximately 40-43%. To measure polypropylene detection, a sample weight of 9.6 mg was used with a temperature scan range of 100 to 300° C. and a temperature ramp rate of 20° C./minute for the heating scan. Nitrogen gas flow is used for all DSC testing. In the recovered nylon, the polypropylene contamination content can be determined by calculating the amount of heat of fusion of the polypropylene homopolymer to the total amount of the heat of fusion of the 42% crystalline polypropylene homopolymer with a heat of fusion of 88 kJ/kg. The following equation can be used:

$$\%PP = (\Delta Hf)P/(88 \text{ kJ/kg})*100$$

wherein $(\Delta Hf)P$ represent the amount of heat of fusion of the polypropylene (J/g) in the sample tested.

The isotactic polypropylene homopolymer has an endotherm between 160-165° C. by DSC testing. The 42% crystalline isotactic polypropylene homopolymer heat of fusion is determined by using the 100% crystalline isotactic polypropylene homopolymer heat of fusion of $\Delta H$ 209 J/g and multiplying by 42% to get the value of 88kJ/kg. The heat of fusion and endotherm temperature range are reported by Ineos Olefins and Polymers USA published with the title "*Typical Engineering Properties of Polypropylene*" (2014).

TABLE 1

| Virgin PA6,6 | | Example 1 Long fiber, dry granulate | Example 2 Short fiber, dry granulate | Example 3 Short fiber, wet granulate |
|---|---|---|---|---|
| % $CaCO_3$ Ash ASTM D5630 | | 0.55 | 0.89 | 0.36 |
| Tensile (MPa) ISO 527-2/1A//50 | 80 | 62.52 | 52.56 | 64.17 |
| PP detect by DSC ISO 11357 | No | 1.0% | 1.0% | Non-detect |
| Moisture ASTM D6869 | | 0.045% | 0.1339% | 0.0427% |
| Melt Flow Rate ASTM D1238 (275° C./0.325 kg) | | 15.07 | 20.21 | 36.23 |
| Sp. Gr. ISO 1183-1/A | | 1.12 | 1.14 | 1.14 |
| Flexural ISO 178/A | | 86.31 | 85.52 | 100.11 |
| Notch IZOD Impact ISO 180/A | | 4.1588 | 3.1362 | 3.4568 |

Examples 1 and 2 were prepared in accordance with the present invention as set forth hereinabove and also in FIG. 1 with the following exceptions. The carpet in Example 1 was shredded and granulated in a dry state, i.e. no water was added thereto. Subsequently the dry shredded and granulated fiber was added to slurry tank 50 and then was refined only utilizing a double disc refiner and no conical refiner. The product thereof was analyzed and the properties thereof are set forth in Table 1, Example 1. With respect to Example 2, once again the carpet was shredded and granulated in a dry state, not having any water added thereto. Thereafter, the dry granulated fibers were added to slurry tank 50 and subjected to the entire remaining process of the present invention including the utilization of refiners 62 and 64, the utilization of a lamella clarifier 70, and the hydroclone separation process as set forth in FIG. 1 and described hereinabove. The properties thereof are set forth in Example 2.

As apparent from Table 1, notable improvements were obtained by the present invention, i.e. Example 3, compared to the prior art dry granulation method as set forth in comparative Examples 1 and 2. Thus, a significant improvement in the low amount of $CaCO_3$ ash was obtained that was at least 34% less than that of comparative Example 1. Another indication of the purity of the nylon obtained according to the present process is set forth by the data with regard to a DSC method for detecting polypropylene. While polypropylene was readily detected in comparative Examples 1 and 2, it could not be detected in inventive Example 3. The melt flow index of the recovered nylon according to the present process was significantly improved by at least 80% over comparative Example 2 and the flexural modulus was improved by at least 140% over comparative Example 1.

The recovery system of the above described invention is generally based upon differences of specific gravity of the various components, i.e. polyolefin, nylon, and the adhesive/$CaCO_3$. The aspects and principles of the present invention are also readily applied to a polyester source, as well as polyester carpets. That is, polyester carpets contain polyolefin fibers such as polypropylene, polyester fibers such as polyethyleneterephthalate (PET), and an adhesive/$CaCO_3$ backing. Since the specific gravity of polyesters such as PET is generally from about 1.3 to about 1.5 and more specifically from about 1.37 to about 1.46, the above-described recovery system can be utilized since the specific gravity of polyester is greater than that of a polyolefin but less than that of the adhesive/$CaCO_3$ backing or binder. Thus, the same principles, concepts, and procedure can be utilized as set forth above with respect to nylon carpets with the polyester being utilized in lieu of a nylon source. The above process description will not be repeated but is rather hereby fully incorporated by reference wherein a polyester source is substituted for a nylon source. The recovery of the polyester material is fairly pure since it contains generally less than about 2% or less by weight, desirably about 1% or less by weight, and preferably non-detectable by a DSC of polyolefin based upon the total weight of the recovered polyester. The amount of $CaCO_3$ ash content of the recovered polyester from the cyclone/bag filter generally is about 0.5% or less, desirably is about 0.45% or less, and preferably is about 0.40% or less by weight based upon the total weight of the recovered polyester.

While in accordance with the patent statutes, the best mode and preferred embodiments have been set forth, the scope of the invention is not limited thereto, but rather, by the scope of the attached claims.

What is claimed is:

1. An aqueous process for recovering nylon from a nylon fiber source comprising the steps of:
   applying a liquid to said nylon fiber source to wet the nylon fiber source, said nylon fiber source comprising nylon fibers, polyolefin fibers, and a latex adhesive backing material;
   shredding said wetted nylon fiber source to form a wet shredded slurry;
   transferring said wet shredded slurry to a granulator and granulating said wet shredded slurry and reducing the length of the nylon fibers and polyolefin fibers and forming a wet granulated slurry; and
   separating said nylon fibers from said polyolefin fibers.

2. The process of claim 1, wherein said liquid is water, and wherein water is added to said shredder and to said granulator.

3. The process according to claim 2, further comprising forming a diluted slurry by combining said wet granulated slurry with a liquid comprising water; and refining said diluted slurry including said fibers and reducing the fiber length thereof to about 2 millimeters or less.

4. The process according to claim 3, further comprising transferring said refined slurry to a clarifier and removing polyolefin fibers from said refined slurry.

5. The process according to claim 4, wherein the amount of said granulated material in said slurry is about 2 percent or less by weight based upon the total weight of said diluted slurry composition, and wherein the amount of polyolefin fibers recovered from said clarifier is about at least 70 percent by weight based upon the total weight of said polyolefin contained in said nylon source.

6. The process according to claim 4, wherein the amount of granulated material in said slurry is about 0.8 percent or less by weight based upon the total weight of said diluted slurry composition, wherein the amount of polyolefin fibers recovered from said clarifier is about at least 90 percent by weight based upon the total weight of said polyolefin contained in said nylon source, and wherein said fiber length is about 0.5 millimeters or less.

7. The process according to claim 2, wherein at least about 95% of said nylon source is covered with said water.

8. The process according to claim 6, wherein at least about 98% of said nylon source is covered with said water.

9. The process according to claim 8, wherein said refiner includes at least one conical refiner, and including adding said clarified slurry to at least one hydroclone and separating out said nylon.

10. The process according to claim 9, wherein a plurality of hydroclones are utilized, and wherein said polyolefin is polypropylene.

11. The process according to claim 10, wherein the adhesive/$CaCO_3$ ash content of said hydroclone separated nylon is about 0.50% by weight or less based upon the total weight of said nylon, and wherein the polyolefin content of said hydroclone separated nylon is about 1.0% or less by weight based upon the total weight of said nylon.

12. The process according to claim 10, wherein the adhesive/$CaCO_3$ ash content of said hydroclone separate nylon is about 0.40% by weight or less based upon the total weight of said nylon, and wherein the polyolefin content of said hydroclone separated nylon is nondetectable by DSC based upon the total weight of said nylon.

13. The process according to claim 4, wherein said nylon source is a furniture covering, a drape, a blind, or a carpet, or any combination thereof.

14. The process according to claim 10, wherein said nylon source is a carpet.

15. A process for recovering polyester from a polyester fiber source comprising the steps of:
   applying a liquid to said polyester fiber source to wet the polyester fiber source, said polyester fiber source comprising polyester fibers, polyolefin fibers, and a latex adhesive backing material;
   shredding said wetted polyester fiber source to form a wet shredded slurry;
   transferring said wet shredded slurry to a granulator and granulating said wet shredded slurry and reducing the length of the polyester fibers and polyolefin fibers and forming a wet granulated slurry; and
   separating said polyester fibers from said polyolefin fibers.

16. The process according to claim 15, wherein said liquid is water, wherein water is added to said shredder and said to granulator, including forming a diluted slurry by combining said wet granulated slurry with water; and refining said diluted slurry including said fibers and reducing the fiber length thereof to about 2 millimeters or less.

17. The process according to claim 16, further comprising transferring said refined slurry to a clarifier and removing polyolefin fibers from said refined slurry.

18. The process according to claim 17, wherein at least 95% of said polyester source is covered with water, wherein the amount of granulated material in said slurry is about 0.8 percent or less by weight based upon the total weight of said diluted slurry composition, wherein the amount of polyolefin fibers recovered from said clarifier is about at least 90 percent by weight based upon the total weight of said polyolefin contained in said polyester source, and wherein said fiber length is about 0.5 millimeters or less.

19. The process according to claim 18, including utilizing a plurality of hydroclones, and wherein said polyester is recovered from said hydroclone.

20. The process according to claim 19, wherein said polyester is polyethyleneterephthalate, wherein said polyester source is a carpet, wherein said hydroclone separated polyethyleneterephthalate contains an adhesive/$CaCO_3$ ash content of about 0.50% by weight or less based upon the total weight of said recovered polyethyleneterephthalate, and wherein the polyolefin content of said hydroclone separated polyethyleneterephthalate contains about 0.45% by weight or less based upon the total weight of said polyethyleneterephthalate.

* * * * *